Feb. 1, 1927.
M. ROSENBLUM
1,616,141
BLADE HOLDER
Filed March 9, 1926
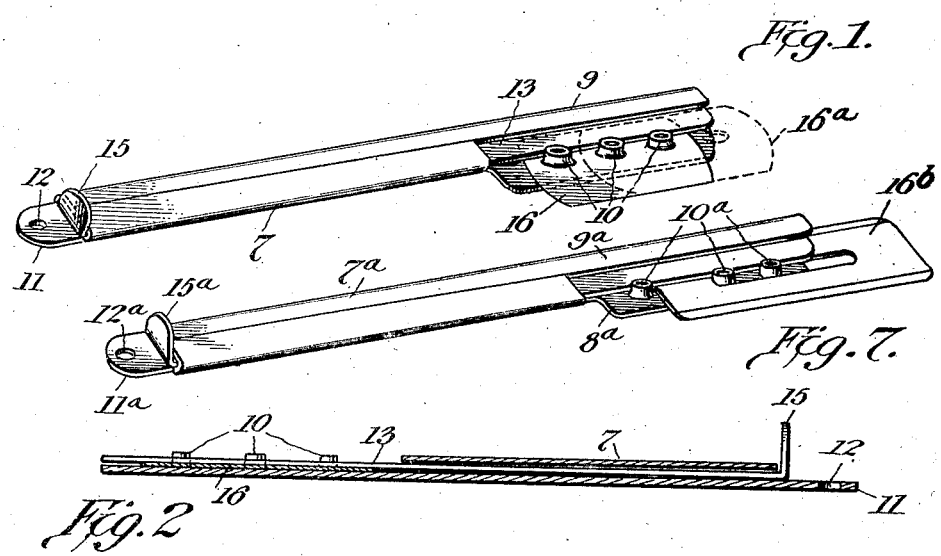
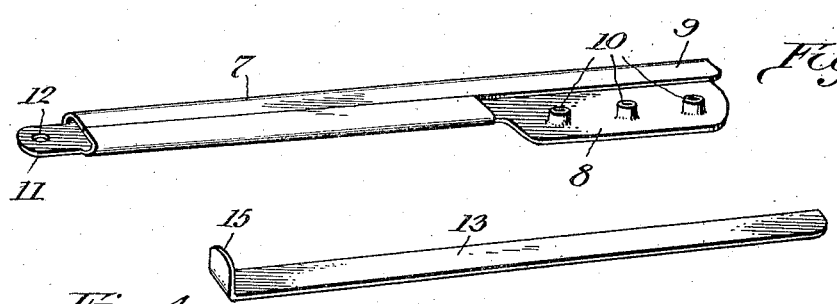
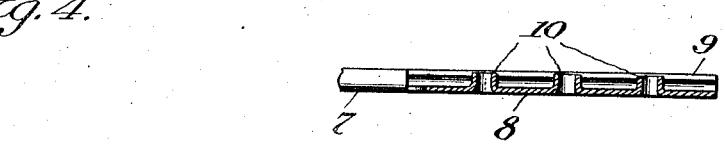
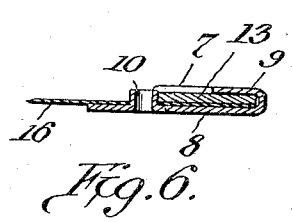
Inventor,
Morris Rosenblum.
By
Attorney Patented Feb. 1, 1927.

1,616,141

UNITED STATES PATENT OFFICE.

MORRIS ROSENBLUM, OF PITTSFIELD, MASSACHUSETTS.

BLADE HOLDER.

Application filed March 9, 1926. Serial No. 93,382.

The present invention relates to devices for holding blades, such as those employed in safety razors, the object being to provide a simple device of a thoroughly practical character, which can be used as a holder for the blades when they are used for cutting, ripping and scraping purposes.

In the accompanying drawings:—

Figure 1 is a perspective view of one form of construction that is at present considered the preferable one, Figure 2 is a longitudinal sectional view therethrough, Figure 3 is a perspective view of the body of the holder, Figure 4 is a similar view of the holding bar, Figure 5 is a longitudinal sectional view through the handle jaw, Figure 6 is a cross sectional view.

Figure 7 is a perspective view of a modified form of construction.

In the form of construction shown, the body of the implement is preferably made of a single piece of sheet metal, which is cut and bent to form a tubular handle 7, constituting a guideway, and having projecting from one end and at one side a substantially flat flanged portion 8, forming a holding jaw. The opposite side of this end is doubled into a U-shaped guideway 9. The jaw 8 is provided with outwardly punched projections 10. The opposite end of the handle may be provided with an ear 11 having an opening 12 therethrough, by which the implement can be hung upon a nail.

Associated with this body, is a holding bar 13, one end of which is preferably rounded off or tapered, as shown at 14, the other end being offset, as illustrated at 15, to provide a finger piece. This bar slides snugly in the handle and its free end moves in the guideway 9, and overlies the portion of the jaw 8, behind the projections 10, said portion thus constituting a jaw that coacts with the jaw 8 to clamp a razor blade, as 16, placed on the jaw 8 with its openings receiving the projections 10, as illustrated in Figures 1 and 6.

It will be evident that a blade can be readily placed in position and clamped to the holder, and that said blade may be used for ripping purposes. Moreover, with the structure disclosed, the blade can be placed either with its outer end behind the outer end of the jaw 8, or it can be engaged and held so that the outer end of said blade projects beyond the holder, as shown at $16^a$ in Figure 1, making its free end available for cutting or scraping purposes.

In the disclosure there is shown a well-known type of blade, but it will be understood that various other kinds of blades may be used, the invention by no means being limited to the use of the specific blade shown. Thus in Figure 7 there is disclosed a handle $7^a$ with a jaw flange $8^a$ at one end thereof, corresponding to the one already described, except that the projections $10^a$ are differently arranged so as to hold a blade, as for example, a slotted blade $16^b$ of well-known type. This blade can be secured in projecting relation, as illustrated in Figure 7. The other parts of the device are the same as those already described, the corresponding elements being correspondingly numbered, but with the exponent "a."

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

1. A blade holder comprising a tubular handle having a longitudinally disposed blade holding jaw at one end provided with a substantially U-shaped guideway along its rear side and alined with the tubular handle, and a holding bar slidable in the handle and having the rear portion of one end slidable in the guideway substantially the length of the jaw, said end projecting beyond the guideway and slidably overlying the jaw to clamp a blade on said jaw.

2. A blade holder comprising a tubular open ended handle having a blade holding jaw at one end, and a holding bar slidably mounted on the handle and having one end projecting from the end of the handle having the jaw and slidable over the jaw, said bar having its other end projecting from the other end of the handle and outturned to form a finger piece.

3. A blade holder comprising a tubular open ended handle having a blade holding jaw at one end and an outstanding perforated ear at its other end, said jaw having a substantially U-shaped guideway along its rear portion, and a holding bar slidably mounted on the handle and having one end projecting from the end of the handle having the jaw and slidable in the guideway and over the jaw, said bar having its other end projecting from the other end of the handle and outturned to form a finger piece that abuts against the end of the handle and leaves the perforation in the ear exposed.

In testimony whereof, I affix my signature.

MORRIS ROSENBLUM.